UNITED STATES PATENT OFFICE.

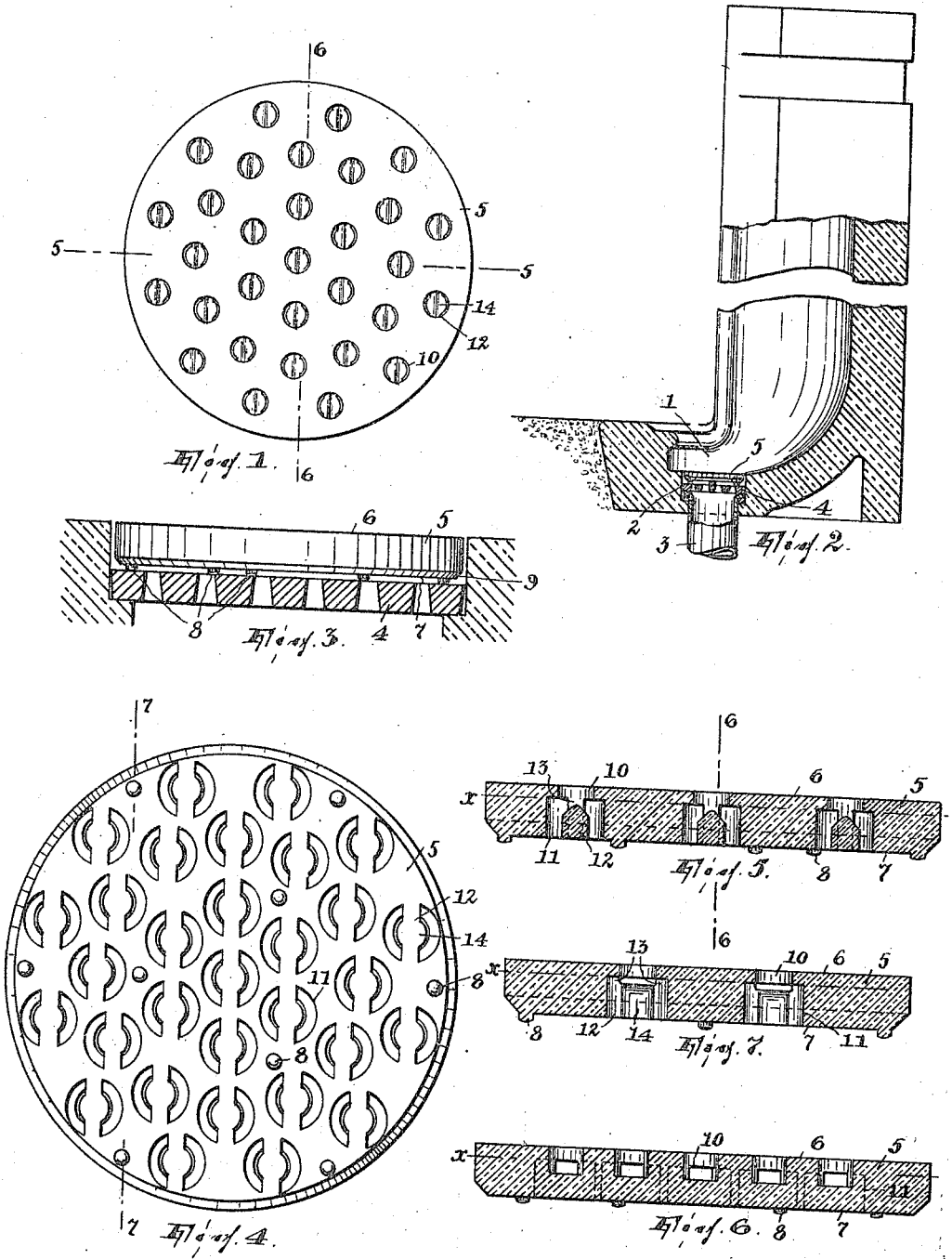

EDWARD WADSWORTH HOTCHKISS, OF NEW YORK, N. Y.

STRAINER-PLATE.

1,233,272.   Specification of Letters Patent.   Patented July 10, 1917.

Application filed March 17, 1917. Serial No. 155,430.

*To all whom it may concern:*

Be it known that I, EDWARD WADSWORTH HOTCHKISS, a citizen of the United States, residing at New York city, in the county of New York and State of New York, have invented certain new and useful Improvements in Strainer-Plates, of which the following is a specification.

Certain drain outlets for sinks, floor drains and the like are usually provided with a metal strainer or grate and over this, in order to give a finish that accords with that of the sink, floor tiling, etc., is placed a removable strainer plate of china, porcelain or the like. My present invention is particularly directed to this type of strainer plate, and it has for its object to provide a strainer plate which will permit a free liquid flow into the drain outlet but prevent the passage of match sticks and similar obstructions. It is not essential, however, that the improved strainer plate herein described and claimed be employed in the specific adaptation referred to above; that is to say, while it will usually be employed so as to rest on another strainer plate, it may be used alone. Nor is it essential that it be composed of any particular material, though its usual application will make it preferable that it be composed of some ceramic substance.

In the drawing,

Figure 1 is a top plan view of the improved strainer plate;

Fig. 2 a view showing an outlet with my strainer plate resting on a metal strainer plate therein, the parts shown, excepting my strainer plate, appearing in section.

Fig. 3 is a view showing on a larger scale the principal elements of Fig. 2;

Fig. 4 is an underneath plan of my strainer plate; and,

Figs. 5 and 6 are sectional views on lines 5—5 and 6—6, respectively, of Fig. 1, (the section line 6—6 for Fig. 6 being also indicated in Fig. 5), while Fig. 7 is a sectional view on line 7—7 of Fig. 4.

The well 1 in Fig. 2 has, according to a well-known construction, an opening 2 in which is fitted a drain pipe 3 which is topped by a metal strainer or grate 4, the openings through which may be either slots or holes. In this instance, the outlet thus formed has a depressed horizontal supporting surface afforded by the top face of the strainer or grate 4, and on this surface the improved strainer plate of this invention is placed so that its top surface is preferably flush with the surface of the well 3 around the outlet.

The improved strainer plate is in the present instance cast as a china disk 5, the top surface 6 of which is flat and the underneath surface 7 of which has integral limited raised points in the form of small rounded knobs or nubbles 8 arranged in concentric circles, say three in one circle and six in another, the latter being near the periphery of the disk; the underneath edge of the disk is preferably circumferentially chamfered or beveled, as at 9, for a reason to be explained.

The strainer holes or passages through the strainer plate may be thus described: Referring to Figs. 5 and 6, each hole or passage is of one diameter, as 10, from the top surface of the plate to the plane $x$, and of a larger diameter, as 11, from said plane to the underneath surface of the plate. Cast in the plate as an integral part thereof and each contained in the larger-diameter portion 11 of each hole is a cross-piece 12 which in the present instance extends from one side to the other of such larger-diameter portion of the hole. This cross-piece is depressed below the plane $x$, but to reinforce it it has the webs 13 (see Figs. 5 and 7) connecting its ends upwardly with the material above the plane $x$. Its mid-portion is enlarged to form a boss 14 more or less approximating in shape and diameter the small-diameter portion 10 of the hole. The top surface of the cross-piece between the webs is formed with sloping surfaces, as best shown in Fig. 5.

Each hole or passage in the present instance is in effect bifurcated; that is, it is single at the top of the plate but double at the underside, the material forming the crosspiece and being between the two hole portions at the under side of the plate being opposed to the single hole portion at the top of the plate. The strainer plate is made of a diameter and contour to fit somewhat loosely the recess of the drain outlet which exists above the strainer or grate 4, on which the strainer plate rests with its knobs or nubbles 8 in contact therewith.

It will thus be seen that while liquid can readily flow through the strainer plate, match sticks or the like cannot pass through it, owing to the cross pieces in the holes, Further, liquids can freely circulate around and under the disk because it rather loosely fits the recess, has its under edge beveled and is raised out of contact with the underlying supporting surfaces by the knobs 8.

Having thus fully described my invention, what I claim as new and desire to secure by Letters Patent is:—

1. A strainer plate having strainer holes each of one diameter as to a portion of the plate's thickness and of a greater diameter as to the remainder of such thickness, each hole having in the greater-diameter portion thereof an obstructing cross-piece spaced from the plane of demarcation between said thicknesses and also spaced on both sides thereof from the sides of the hole.

2. A strainer plate having strainer holes each of one diameter as to a portion of the plate's thickness and of a greater diameter as to the remainder of such thickness, each hole having in the greater-diameter portion thereof a boss arranged in substantially registering relation to the smaller-diameter portion of the hole and spaced from the plane of demarcation between said thicknesses and also spaced on opposite sides thereof from the sides of the hole.

3. A strainer plate having bifurcated strainer passages extending therethrough and each forming a single hole at one side and two holes at the other side of the plate, each of the latter holes being substantially wholly offset laterally of the single hole.

4. In combination, a drain outlet having a depressed supporting surface, and a strainer plate arranged over and having limited rounded nubbles on the under side resting on said surface.

5. In combination, a drain outlet having a depressed supporting surface, and a strainer plate loosely fitting the outlet and arranged over and having limited raised points on the under side resting on said surface and also having its under edge circumferentially beveled and clear all around of the part of said outlet immediately around it.

In testimony whereof I affix my signature.

EDWARD WADSWORTH HOTCHKISS.

Copies of this patent may be obtained for five cents each, by addressing the "Commissioner of Patents, Washington, D. C."